US006601098B1

(12) United States Patent
Case et al.

(10) Patent No.: US 6,601,098 B1
(45) Date of Patent: Jul. 29, 2003

(54) TECHNIQUE FOR MEASURING ROUND-TRIP LATENCY TO COMPUTING DEVICES REQUIRING NO CLIENT-SIDE PROXY PRESENCE

(75) Inventors: Ralph B. Case, Raleigh, NC (US); Brad B. Topol, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/326,307

(22) Filed: Jun. 7, 1999

(51) Int. Cl.$^7$ ............................................. G06F 15/173
(52) U.S. Cl. ..................................... 709/224; 370/253
(58) Field of Search ................................. 709/224, 225, 709/226; 370/257, 253, 254

(56) References Cited

U.S. PATENT DOCUMENTS

| | | | | |
|---|---|---|---|---|
| 5,521,907 A | * | 5/1996 | Ennis et al. ............... | 370/253 |
| 5,574,860 A | * | 11/1996 | Perlman et al. ............ | 709/220 |
| 5,675,576 A | * | 10/1997 | Kalampoukas et al. ..... | 370/232 |
| 5,802,299 A | * | 9/1998 | Logan et al. .............. | 709/218 |
| 5,812,776 A | * | 9/1998 | Gifford ..................... | 709/217 |
| 5,870,546 A | * | 2/1999 | Kirsch ...................... | 705/26 |
| 5,878,233 A | * | 3/1999 | Scholoss ................... | 709/235 |
| 5,944,840 A | * | 8/1999 | Lever ....................... | 714/20 |
| 5,956,490 A | * | 9/1999 | Buchholz et al. .......... | 709/223 |
| 6,012,096 A | * | 1/2000 | Link et al. ................. | 709/233 |
| 6,021,439 A | * | 2/2000 | Turek et al. ............... | 709/224 |
| 6,052,730 A | * | 4/2000 | Felciano et al. ........... | 709/225 |
| 6,078,786 A | * | 6/2000 | Wandernoth et al. ...... | 342/118 |
| 6,115,357 A | * | 9/2000 | Packer et al. .............. | 370/231 |
| 6,151,686 A | * | 11/2000 | McDonough et al. ....... | 714/37 |
| 6,175,869 B1 | * | 1/2001 | Ahuja et al. ............... | 709/226 |
| 6,182,125 B1 | * | 1/2001 | Borella et al. ............. | 709/218 |
| 6,185,598 B1 | * | 2/2001 | Farber et al. .............. | 709/200 |
| 6,212,171 B1 | * | 4/2001 | LaFollette et al. ......... | 370/257 |
| 6,226,752 B1 | * | 5/2001 | Gupta et al. ............... | 713/201 |
| 6,240,454 B1 | * | 5/2001 | Nepustil .................... | 709/229 |
| 6,272,539 B1 | * | 8/2001 | Cuomo et al. ............. | 709/223 |
| 6,282,542 B1 | * | 8/2001 | Carneal et al. ............ | 707/10 |
| 6,304,967 B1 | * | 10/2001 | Braddy ..................... | 709/224 |
| 6,314,465 B1 | * | 11/2001 | Paul et al. ................. | 709/226 |
| 6,321,264 B1 | * | 11/2001 | Fletcher et al. ........... | 709/224 |
| 6,373,836 B1 | * | 4/2002 | Deryugin et al. .......... | 370/352 |
| 6,438,592 B1 | * | 8/2002 | Killian ...................... | 709/224 |
| 6,446,028 B1 | * | 9/2002 | Wang ....................... | 702/186 |
| 6,446,121 B1 | * | 9/2002 | Shah et al. ................ | 709/224 |

OTHER PUBLICATIONS

Konduri et al., "A Framework for Collaborative and Distributed Web–based Design", 1999, ACM, pp. 898.*

Siegle et al., "Monitoring Program Bahaviour on SUPRENUM" 1992, ACM, pp. 332–341.*

Adelstein et al., "A Tested for Characterizing Dynamic Response of VirtualEnvironment Spatial Sensors", 1992, ACM, pp. 15–22.*

Jacobson, "A distributed measurement technique for an operating ethernet network (abstract only)", 1987, ACM, 3 pages.*

Borella et al., "The effects of Internet latency on user perception of tnformation content", 1997 IEEE, pp. 19321936.*

(List continued on next page.)

Primary Examiner—Bunjob Jaroenchonwanit
(74) Attorney, Agent, or Firm—Jeanine S. Ray-Yarletts; Marcia L. Doubet

(57) ABSTRACT

A method, system, and computer-readable code for measuring network latency between a client computer and a server machine without requiring any additional software on the client. Network latency is a measurement that reflects the network round trip delay between a client machine and a server machine. The present invention defines a novel technique for gathering latency information. This information may be used in a variety of ways (such as making policy decisions that may limit the amount of data sent over a communications path due to detection of high latency in the network).

23 Claims, 4 Drawing Sheets

OTHER PUBLICATIONS

Wieland et al., "Implementing a distributed combat simulation on the time warp operating system", 1988, ACM, pp. 1269–1276.*

Pei et al., "Web prefetching between low–bandwidth clients and proxies: Potential and performance", 1999, ACM, pp. 178–187.*

Grandi et al., "Increasing modem performance", 1998, USENET, http://groups.google.com/groups, 11 pages.*

Fielding et al., RFC 2068, "HTTP/1.1",, chapter 10, Jan. 1997, 14 pages.* http://www.ietf.org/rfc/rfc2616.txt?number=2616; "Network Working Gorup Request for Comments: 2616, Hypertext Transfer Protocol—HTTP/1.1".

* cited by examiner

TECHNIQUE FOR MEASURING ROUND-TRIP LATENCY TO COMPUTING DEVICES REQUIRING NO CLIENT-SIDE PROXY PRESENCE

BACKGROUND OF THE INVENTION

1. Field of the Invention

The present invention relates to a computer system, and deals more particularly with a method, system, and computer-readable code for measuring round-trip latency to computing devices without requiring a client-side proxy presence.

2. Description of the Related Art

It is commonplace today for computer users to connect their machines to other computers, known as "servers," through a network. The network may be a private network, such as a corporate intranet of networked computers that is accessible only to computer users within that corporation, or it may a public network, such as the Internet or World-Wide Web. The Internet is a vast collection of computing resources, interconnected as a network, from sites around the world. The World-Wide Web (referred to herein as the "Web") is that portion of the Internet which uses the HyperText Transfer Protocol ("HTTP") as a protocol for exchanging messages. (Alternatively, other protocols such as the "HTTPS" protocol can be used, where this protocol is a security-enhanced version of HTTP.)

The user working in a networked environment will have software running on his workstation to allow him to create and send requests for information to a server and to see the results. When the user connects to the Web, these functions are typically combined in software that is referred to as a "Web browser," or "browser." After the user has created his request using the browser, the request message is sent out into the Internet for processing. The target of the request message is one of the interconnected servers in the Internet network. That server will receive the message, attempt to find the data satisfying the user's request, format that data for display with the user's browser, and return the formatted response to the browser software running on the user's workstation. The response is typically in the form of a displayable file, referred to as a "Web page", that may contain text, graphics, images, sound, video, etc.

These are examples of a client-server model of computing, where the machine at which the user requests information is referred to as the client, and the computer that locates the information and returns it to the client is the server. In the Web environment, the server is referred to as a "Web server". The user may connect his computer to a server using a "wireline" connection or a "wireless" connection. Wireline connections are those that use physical media such as cables and telephone lines. Wireless connections, on the other hand, use media such as satellite links, radio frequency waves, and infrared waves. The user's computer may be any type of computer processor, including laptop, hand held or mobile computers; vehicle-mounted devices; cellular telephones and desktop screen phones; desktop computers; mainframe computers; etc., having processing and communication capabilities. The remote server, similarly, can be one of any number of different types of computer which have processing and communication capabilities. The computer capabilities vary widely from high speed, multi-processors with extensive real and virtual memory, to small, single processors that process a single task with a limited function operating system and limited memory. These techniques are well known in the art, and the hardware devices and software which enable their use are readily available. Hereinafter, the user's computer will be referred to as a "workstation," and use of the terms "workstation" or "server" refers to any of the types of computing devices described above.

As more people connect their workstations to the Web, the number of messages and files being sent is skyrocketing. (Hereinafter, the terms "message" and "file" are used interchangeably when referring to data being sent through a network, unless otherwise stated.) Coupled with this increase in the number of network users and files is an increase in the size of the files commonly being sent. For example, a Web page may include one or more graphic images, each of which may consist of several hundred thousand bytes of data. Users may request many such files over the course of a day's work, or in their personal network communications.

A great deal of user frustration can result when trying to access popular Web sites which must service an ever-increasing number of user requests, and which often have slow response times due to this heavy request load. Additionally, long delays may result when users request delivery of large files to their workstation (or even when requesting relatively small files from congested servers), creating yet more user frustration. The popularity of using portable computers such as handheld devices for connecting to the Internet, or other networks of computers, is increasing as user interest in computing becomes pervasive and users are more often working in mobile (i.e wireless) environments. At the same time, the popularity of making network connections using connection services that charge fees based upon the duration of connections (such as cellular services, which are commonly used for wireless connections from portable computers) is also growing. When using this type of relatively expensive connection, the longer the user must wait to receive a file, the higher his connection charges will be. Wireless connections also tend to have high network latencies, due to the limited bandwidth available and the extra network hops (e.g. gateways) that are involved with wireless transmission. As a result, a user may have to wait a relatively long time to receive a response to a request he has sent into the network. In addition, the capabilities of the client's computer may limit the amount of data that can be received. These are some of the factors behind an increasing concern with optimizing performance of network computing environments.

One area of interest in network computing performance is the overall response time from the moment the client issues a request to a server until the server's response is received by the client. This is known as the "round trip" time of a request/response message pair. A key component of the round trip time is the network latency. Network latency is the amount of time a message spends in the network and is a valuable measurement that can be used in a number of ways. (Round trip time also includes processing time at the server and any intermediate gateways. This processing time is not pertinent to the present invention. Hereinafter, the terms "round trip time" and "network latency" will be used interchangeably.) For example, the measured latency of a network can be analyzed to determine where bottlenecks occur. This analysis allows the network engineers to add or replace resources to reduce or eliminate a bottleneck, therefore improving overall response times by reducing network latency. Another value of measuring network latency is to use the latency information to dynamically determine the content of the information to be sent in response to a client request. For example, if a server receives a request for a Web page from a client over a network with very high latencies, it would be advantageous for the server to reduce or filter the amount of information sent in response to the client's request. An example of the type of content reduction that could be used in this situation is applying a transcoding filter to transform color images into gray scale images, thereby drastically reducing the size of the response file and accordingly, the time it will take for this file to be transmitted to the client. In severe cases, more drastic forms of content reduction (such as eliminating video or image files completely) could be taken. Network latency information could also be combined with client-specific information, such as whether the client is connected over a relatively expensive wireless connection or a wireline connection, in making content-reduction choices.

This type of performance measurement in a network typically involves providing software that resides on the client machine. This software acts as a proxy or "agent" for the client and participates in capturing performance data for the network connection. This client-side software would typically have a counterpart on the server side of the communications (i.e. a "server-side proxy") that also participates in capturing performance information. This type of performance measuring technique therefore involves distributing the client and server measurement software to all clients and servers that are to be measured. However, this approach has a number of drawbacks. First, not all computers communicating on a network are capable of running the client-side software because of limitations such as operating system constraints (e.g. inability to support multi-tasking) and/or memory size that is so severely constrained as to make adding the measurement software impractical or even impossible. These limitations typically exclude the small, limited function computers that are so rapidly growing in popularity from being able to participate in the capture of performance data such as network latency information. In addition, the sheer volume and number of different types of client-side devices make it infeasible to use a technique that requires modifying (i.e. installing special software on) the client devices.

Accordingly, a need exists for a technique for measuring the latency of a network connection between a client and a server without requiring additional software on the client machine.

SUMMARY OF THE INVENTION

An object of the present invention is to provide a technique to measure network latency between a client and a server.

Another object of the present invention is to provide a technique to measure the network latency between a client and a server without requiring any client-side software.

It is yet another object of the present invention to provide this technique in a manner that does not require explicit participation or awareness of the user of the client computer.

It is another object of the present invention to enable a server application to gather network latency information to be used for optimizing communications between the client and the server.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and program product for use in a computing environment having a connection to a network, for enabling collection of round-trip network latency measurements without requiring additional software on the client. In one aspect, this technique comprises: receiving a first client request for a first predetermined Uniform Resource Locator (URL); storing a first time at which the first client request was received; responding to the first client request with a redirection response, wherein the redirection response specifies a second predetermined URL; receiving a second client request for the second predetermined URL, wherein the second client request is received at a second time; computing a difference between the second time and the first time, wherein the difference represents a round trip latency between the client and the server; and sending, responsive to receiving the second client request, information associated with the first predetermined URL.

Preferably, the redirection response uses a page temporarily moved status code or a page permanently moved status code. The first predetermined URL may be a configurable parameter. Optionally, the first predetermined URL may be determined using a counter of requests received.

The server may be a server-side proxy server. In this case, the technique further comprises: forwarding the first client request to the server; and receiving, at the proxy server, a response to the forwarded request, wherein the response comprises the information associated with the first predetermined URL.

In another aspect, this technique comprises: receiving a first client request for a first predetermined Uniform Resource Locator (URL); storing a first time at which the first client request was received; responding to the first client request with a redirection response, wherein the redirection response specifies a second predetermined URL; receiving a second client request for the second predetermined URL, wherein the second client request is received at a second time; storing the second time for subsequent computation of a round trip latency between the client and the server, wherein the round trip latency is a difference between the second time and the first time; and sending, responsive to receiving the second client request, information associated with the first predetermined URL.

The present invention will now be described with reference to the following drawings, in which like reference numbers denote the same element throughout.

DESCRIPTION OF THE PREFERRED EMBODIMENT

Figure 1:
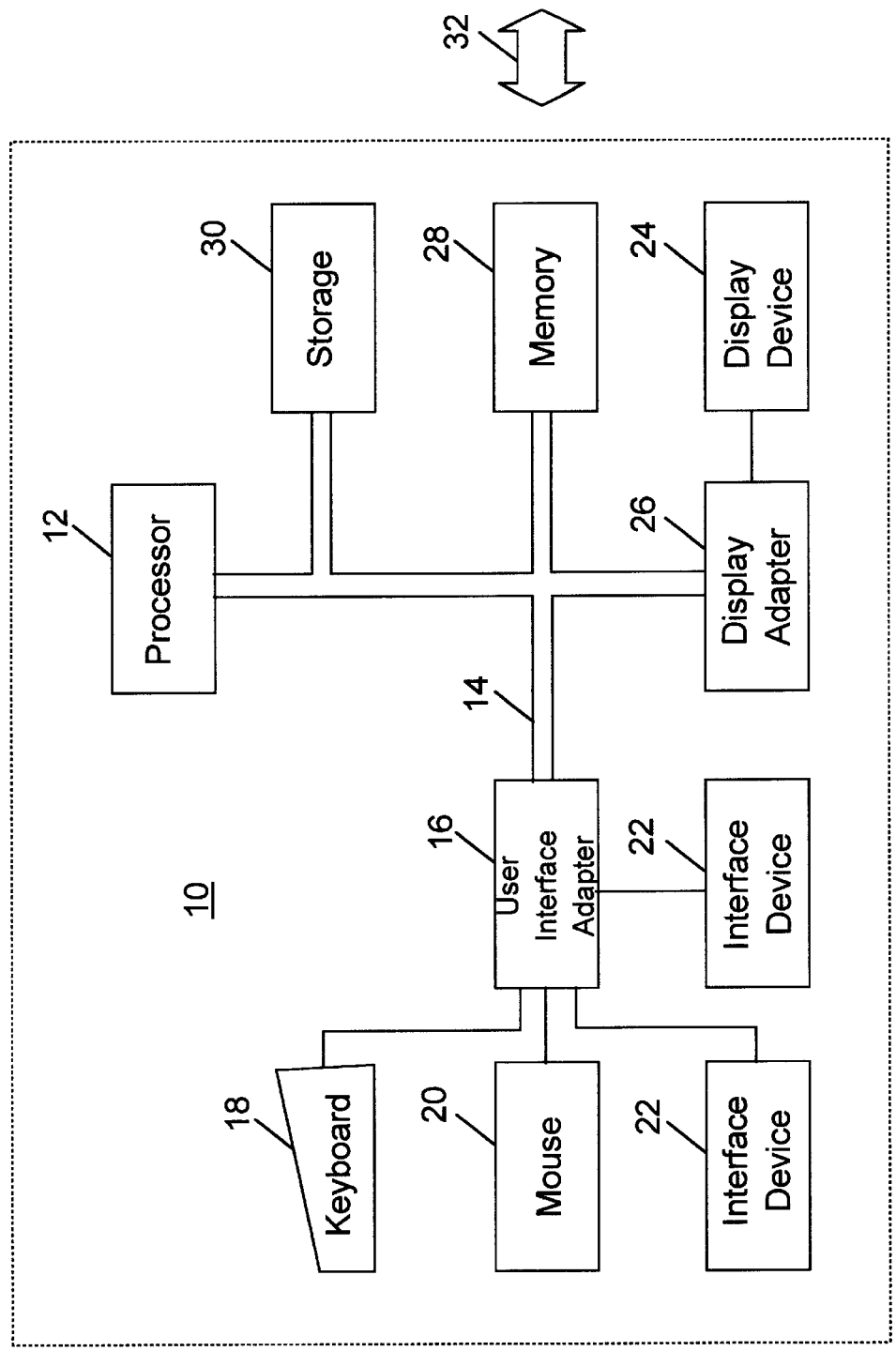
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
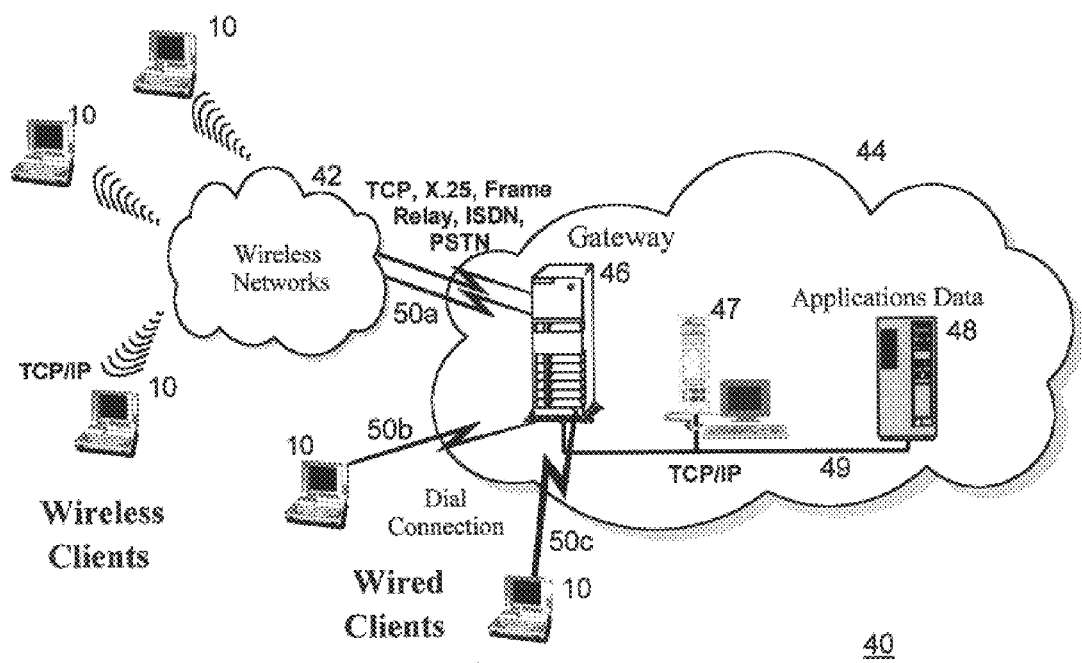
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and (wired) network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, x0.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The preferred embodiment of the present invention will now be discussed with reference to FIGS. 3 and 4.

In the preferred embodiment, the present invention is implemented as one or more modules (also referred to as code subroutines, or "objects" in object-oriented programming) of a computer software program that resides on a network server. In the preferred embodiment, this server is a Web-based server that is communicating with one or more clients using the HTTP protocol. This software will be used where (1) a user interacts with a browser and requests one or more Web pages for accessing by that browser, and (2) software application(s) running on a server respond to the user's request for Web pages, and return data to the user's browser in response. Typically, this software will be used in an Internet environment, where the server is a Web server and the request is formatted using HTTP. Alternatively, the server may be in a corporate intranet, an extranet, or in any other network environment. Use of the term "Internet" herein, when discussing processing associated with the user's request, includes processing that occurs in an intranet or extranet, unless otherwise stated.

Figure 3A:
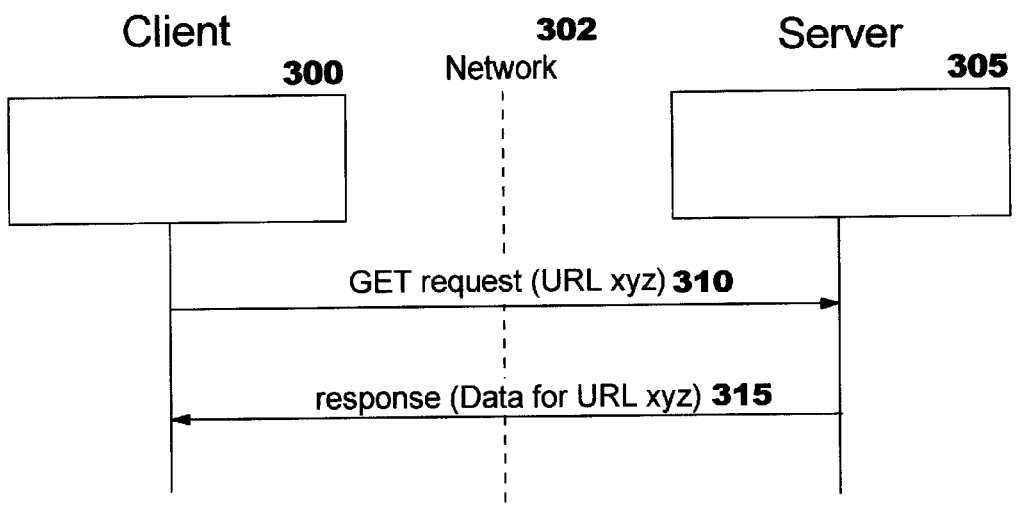
FIG. 3A and FIG. 3B illustrate the message flows between a client and a server according to the prior art and when using the preferred embodiment of the present invention, respectively.

FIG. 3A illustrates an example of the existing message flows between a client 300 and a server 305 communicating over a network 302 using the HTTP 1.1 protocol. For this example, the client 300 is preferably running one of the commonly available Web browsers such as Netscape Navigator® or Internet Explorer, and the server 305 is a Web server providing Internet services to the client. The client machine issues an HTTP GET request 310 which specifies a URL of a requested Web page. For purposes of illustration, the message flow 310 indicates that the URL is "xyz". The server receives this request, and responds to the client at 315 with the data associated with the URL xyz. This is a typical client/server interaction, using message flows which are well known in the art.

Figure 3B:
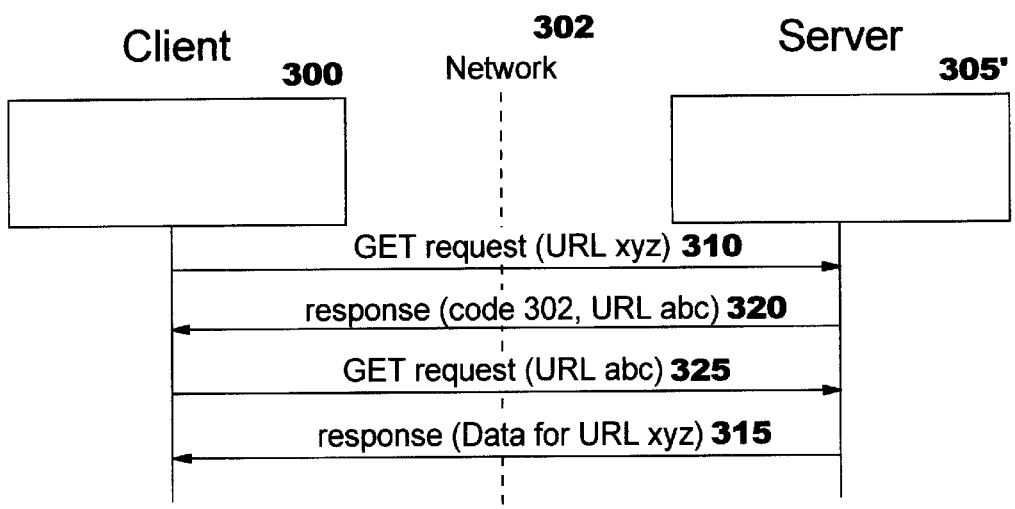

FIG. 3B illustrates the effect on the same client/server interaction when the preferred embodiment of the present invention has been implemented on the server 305'. The client 300 and server 305' use the HTTP 1.1 protocol as in FIG. 3A. The client issues an HTTP GET request 310 which contains the URL "xyz". For purposes of this example, suppose the URL "xyz" is a special URL, as will be discussed below with respect to FIG. 4, and which triggers operation of the present invention. The server receives this request as in FIG. 3A. Detecting the special URL, the present invention responds to the client at 320 using a redirect response (shown in FIG. 3B as status code "302",for "page temporarily moved", according to the preferred embodiment). In this response 320, the server also includes a different special URL, which is a redirection URL and is shown in this example as "abc" for purposes of illustration. The client receives the response 320. In normal browser processing, the redirect status code of 302 causes the browser to resend the HTTP GET request at 325 with the redirected URL of "abc". (The process of resending the HTTP GET request with the updated URL is required for a browser that supports the HTTP 1.1 specification for redirection.) The server receives the GET request 325 for URL abc, and then sends 315 the data associated with the originally-requested URL xyz (requested in message 310).

Figure 4:
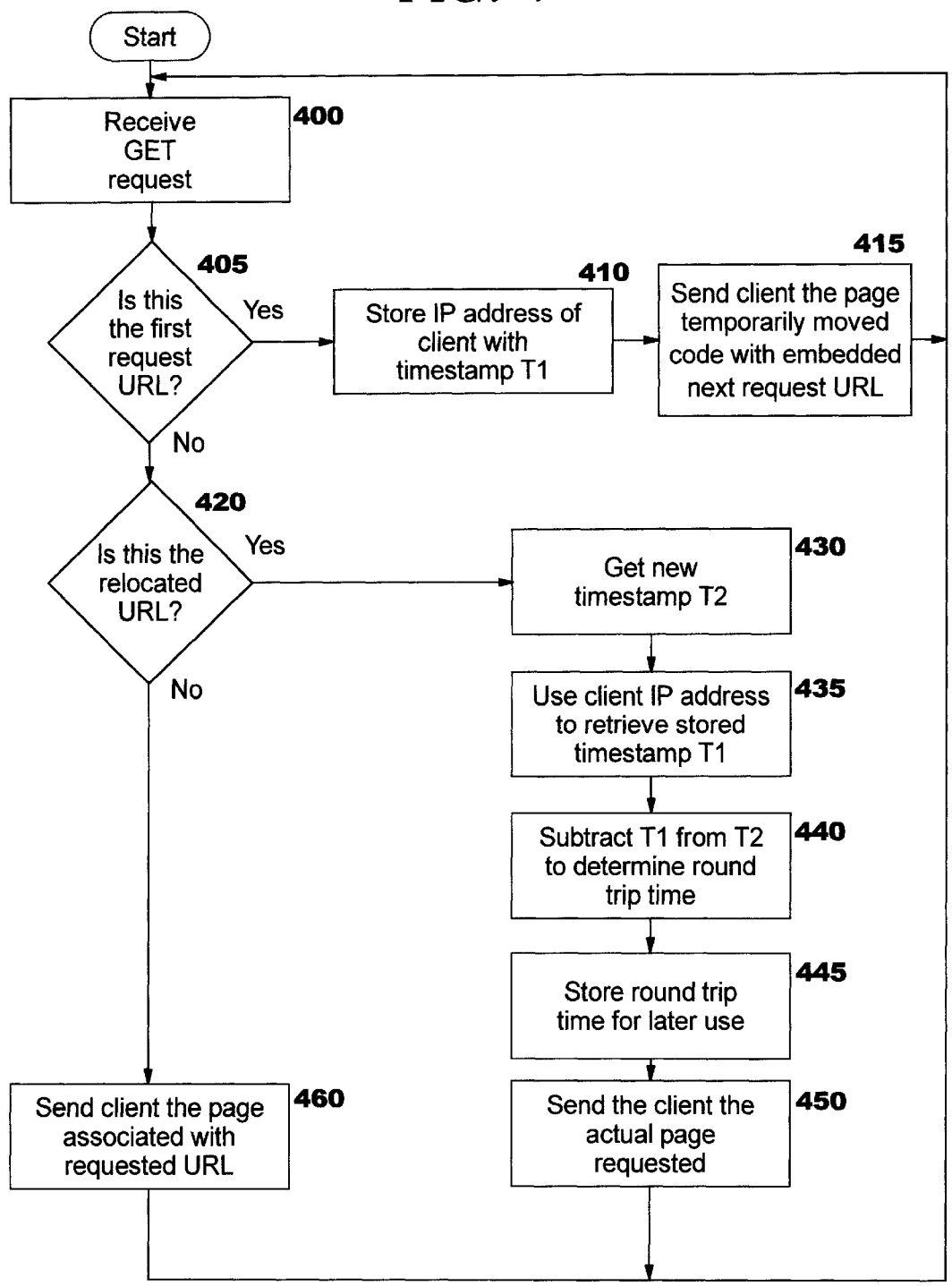
FIG. 4 provides a flowchart depicting the preferred embodiment of the logic used on the network server to implement the present invention.

FIG. 4 illustrates the logic used to implement the preferred embodiment of the present invention. This implementation preferably executes on the server machine participating in a client-server communication. Alternatively, this logic may execute on a server-side proxy or an intermediate proxy. Notably, however, no code beyond an HTTP-compliant Web browser (or a browser which provides functionality similar to HTTP) is required on the client workstation in order for the present invention to operate. Prior to operation of the logic of FIG. 4, a client in the network has sent a request for a particular URL, expecting a response from the server as has been described with reference to element 310 of FIG. 3B. The URL in this request can be specified in a variety of ways, including direct input from the user of the client machine, user selection from a list of URLs, automated generation by an application running on the client machine, etc.

The processing of FIG. 4 begins at Block 400, where the server receives a request for a URL from the client. In the preferred embodiment, this request is an HTTP GET and includes the client's IP (Internet Protocol) address, a target URL the client computer has requested, as well as other information which is not relevant to operation of the present invention. The server in Block 405 checks the request to determine if the HTTP GET request is for a "first request" URL. In the preferred embodiment, the "first request" URL is a predetermined URL that the server identifies to invoke the present invention. This URL may be a configurable parameter of the present invention, or it may be selected during implementation and coded directly into the software of the present invention. If this predetermined URL is detected at Block 405, processing continues to Block 410 where the network address or IP address of the requesting client from the request received at Block 400 is used as a key or index to create an entry in a hash table (or other equivalent storage mechanism) where a timestamp (T1) of the current time is saved. At Block 415, the client is then sent a response comprised of a "page temporarily moved" response (status code 302) and an embedded "next request" URL. The page temporarily moved response is documented in the HTTP 1.1 RFC (Request For Comments) 2126, which is available on the Web at http://www.ietf.org/rfc/rfc2616.txt?number= 2616. Processing of this iteration through the logic of FIG. 4 is then complete.

The "page temporarily moved" process responds to the client with a new location (referred to herein as the "next request, or "relocated", URL) of the originally-requested page to allow the client to re-issue the request (i.e. using a subsequent HTTP GET request) with this new location. This process is referred to as a "redirect", or "redirection", and is well known in the art. According to the present invention, the "next request" URL is also a predefined URL that the server can recognize, upon receipt, to invoke further processing of the present invention. The browser on the client machine will generate the new request without requiring any participation or awareness of the user, as required by the HTTP 1.1 specification for processing a response with the status code 302.

The reissued HTTP GET request using the next request URL is received at Block 400, during a subsequent iteration of the logic of FIG. 4. At Block 405, the check for the first request URL will fail. Processing then proceeds to Block 420 where the received URL is checked for the next request or relocated URL. If, at Block 420, the relocated URL is detected, the present invention then gets a new, current timestamp (T2) at Block 430. The client's IP address from the current HTTP GET request is used in Block 435 as the key to the hash table to retrieve the time stamp (T1) of the client's first request URL (which was previously stored at Block 410 on a prior iteration of this logic). In Block 440, the network latency, or round-trip time between the client and server is calculated by subtracting the timestamp (T1), when the first request was received, from the time stamp (T2), when the subsequent response was received. The result is preferably stored (Block 445) for use by a subsequent process or application that may benefit from use of network latency information. (Alternatively, the result may be used by a currently-executing application.) The server processing then concludes by sending the actual page requested by the client at Block 450.

If the current client request (received at Block 400) is not the first request URL (i.e. Block 405 has a negative result) and is not the relocated URL (i.e. Block 420 has a negative result), then the logic for the present invention is not invoked. Processing continues to Block 460 where the server responds to the requesting client by sending the data (i.e. page) associated with the URL in the current client request, as in the current art.

Since processing the "page temporarily moved" status code response is a required part of the HTTP protocol, no client side software modification is required for the present invention. This allows any computer, including small, limited function computers, to participate in collecting network latency information without the burden of installing, storing, or executing additional software. In addition, because the URL to be used as the first request URL is defined at the server, there is no requirement for involvement of the human user. For example, suppose a user normally requests some type of "home page" or log-in page as a matter of practice. By defining the URL of this page at the server as the first request URL, the present invention will automatically be invoked each time this user accesses this page.

In an alternative approach, the human user may be directly involved in using the present invention. In this approach, the first request URL is entered into the client's computer by the user as a way for the user to cause current latency information to be captured for further analysis. For example, this first request URL may be tied to a "problem reporting" URL on the server, where that problem reporting; URL is widely known throughout an enterprise or organization for reporting network performance problems (such as the URL of a Help Desk application). When the user accesses this problem reporting URL, the latency information is captured using the present invention as a part of the problem reporting process. This may occur with or without the user's awareness.

In an alternative aspect of the preferred embodiment, the timestamp T2 may be stored in the hash table entry corresponding to the client IP address during the processing of Block 440, instead of immediately using the T2 value to compute the round trip delay. In this aspect, the table of stored values may be used to compute the delay by a separately-executing process. This process may execute concurrently with the code of the present invention, or may be invoked at a later time.

In yet another alternative aspect of the present invention, the first request URL is not predetermined as a specific URL. Instead, the server may periodically trigger invocation of the logic of FIG. 4, for example to sample network latency at different times of the day or to refresh the stored latency values. When this aspect is used, the test in Block 405 is replaced by checking to determine whether it is time to take a sample. A counting technique may be used for this sampling process, whereby every Nth request (where N may be a configuration parameter) received at Block 400 invokes the present invention (by transferring control to Block 410). Or, a specific time of day (perhaps coinciding with expected peak network traffic) may be checked for in Block 405, whereby a positive result to this test also invokes the present invention. Or, Block 405 may check for the first request (or perhaps the Nth request) from a specific client IP address, and invoke the processing of the present invention upon arrival of this request.

While the preferred embodiment has been discussed in terms of using the HTTP 1.1 protocol, other protocols providing similar function may be used without deviating from the inventive concepts disclosed herein. Further, while the preferred embodiment has been described as using the page temporarily moved message, other redirection types may be used alternatively, such as the "page permanently moved" status code. "Page permanently moved" is defined as status code 301 in the HTTP 1.1 protocol. As described above with reference to the page temporarily moved message, processing the page permanently moved status code is also a required part of the HTTP protocol, and thus requires no client-side software modification.

The latency information gathered by the present invention may be used as input for policy decisions including those that determine the type of transcoding and content reduction that should be performed before sending a response to a client with a high latency network connection.

The present invention may alternatively operate on a server-side proxy (or any intermediate proxy which does not reside on the client), using an extension of the logic illustrated in FIG. 4. This extension comprises sending a proxy-to-server request for the Web page requested (in the first request URL) by the client, and receiving the response from the server. It will be obvious to one of ordinary skill in the art how this additional processing may be added following Block 415 of FIG. 4. The proxy may be able to perform the processing of FIG. 4 with essentially no added time delay being experienced by the user at the client machine. When the first request URL arrives at the proxy, it may happen that the proxy needs to fetch information (such as the requested page) from the server. At the same time the proxy returns the redirect response to the client, the proxy forwards a request to the server to fetch the required information. When the round trip time between the proxy and server is less than the round trip time between the proxy and client, then the fetched information will arrive at the proxy before the second client request (i.e. for the redirected URL) is received at the proxy. In this case, the proxy immediately responds to the client's second request with the pre-fetched information.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment connected to a network, computer readable code stored on a storage medium readable by a computer system in said environment for measuring round-trip latency between a client and a server without requiring a client-side proxy presence, comprising:

computer readable code means for receiving, at said server from said client, a first client request for a first Uniform Resource Locator (URL);

computer readable code means for determining, responsive to receiving said first client request, that said round-trip latency between said client and said server is to be measured; and computer readable code means for measuring said round-trip latency, further comprising:

computer readable code means for storing a first time at which said first client request was received;

computer readable code means for responding to said first client request with a redirection response, wherein said redirection response specifies a second URL;

computer readable code means for receiving, from said client, a second client request for said second URL, wherein said second client request is received at a second time;

computer readable code means for computing a difference between said second time and said first time, wherein said difference represents said round-trip latency; and computer readable code means for sending to said client, responsive to receiving said second client request, information associated with said first URL.

2. Computer readable code for measuring round-trip latency according to claim 1, wherein said redirection response uses a page temporarily moved status code.

3. Computer readable code for measuring round-trip latency according to claim 1, wherein said redirection response uses a page permanently moved status code.

4. Computer readable code for measuring round-trip latency according to claim 1, wherein said first URL is a configurable parameter defined to trigger said computer readable code means for determining.

5. Computer readable code for measuring round-trip latency according to claim 1, wherein said server is a server-side proxy server, and further comprising:

computer readable code means for forwarding said first client request from said proxy server to a target server identified in said first client request; and computer readable code means for receiving, at said proxy server, a response to said forwarded request from said target server, wherein said response comprises said information associated with said first URL.

6. Computer readable code for measuring round-trip latency according to claim 1, wherein said computer readable code means for determining is triggered using a counter of requests received.

7. In a computing environment connected to a network, computer readable code stored on a storage medium readable by a computer system in said environment for measuring round-trip latency between a client and a server without requiring a client-side proxy presence, comprising:

computer readable code means for receiving, at said server from said client, a first client request for a first Uniform Resource Locator (URL);

computer readable code means for determining, responsive to receiving said first client request, that said round-trip latency between said client and said server is to be measured; and computer readable code means for measuring said round-trip latency, further comprising:

computer readable code means for storing a first time at which said first client request was received;

computer readable code means for responding to said first client request with a redirection response, wherein said redirection response specifies a second URL;

computer readable code means for receiving, from said client, a second client request for said second URL, wherein said second client request is received at a second time;

computer readable code means for storing said second time for subsequent computation of said round-trip latency, wherein said round-trip latency is a difference between said second time and said first time; and computer readable code means for sending to said client, responsive to receiving said second client request, information associated with said first URL.

8. A system for measuring round-trip latency between a client and a server without requiring a client-side proxy presence in a computing environment connected to a network, comprising:

means for receiving, at said server from said client, a first client request for a first Uniform Resource Locator (URL);

means for determining, responsive to receiving said first client request, that said roundtrip latency between said client and said server is to be measured; and means for measuring said round-trip latency, further comprising:

means for storing a first time at which said first client request was received;

means for responding to said first client request with a redirection response, wherein said redirection response specifies a second URL;

means for receiving, from said client, a second client request for said second URL, wherein said second client request is received at a second time;

means for computing a difference between said second time and said first time, wherein said difference represents said round-trip latency; and means for sending to said client, responsive to receiving said second client request, information associated with said first URL.

9. The system for measuring round-trip latency according to claim 8, wherein said redirection response uses a page temporarily moved status code.

10. The system for measuring round-trip latency according to claim 8, wherein said redirection response uses a page permanently moved status code.

11. The system for measuring round-trip latency according to claim 8, wherein said first URL is a configurable parameter defined to trigger said means for determining.

12. The system for measuring round-trip latency according to claim 8, wherein said server is a server-side proxy server, and further comprising:

means for forwarding said first client request to from said proxy to a target server identified in said first client request; and means for receiving, at said proxy server, a response to said forwarded request from said target server, wherein said response comprises said information associated with said first URL.

13. The system for measuring round-trip latency according to claim 8, wherein said means for determining is triggered using a counter of requests received.

14. A system for measuring round-trip latency between a client and a server without requiring a client-side proxy presence in a computing environment connected to a network, comprising:

means for receiving, at said server from said client, a first client request for a first Uniform Resource Locator (URL);

means for determining, responsive to receiving said first client request, that said round-trip latency between said client and said server is to be measured; and means for measuring said round-trip latency, further comprising:

means for storing a first time at which said first client request was received;

means for responding to said first client request with a redirection response, wherein said redirection response specifies a second URL;

means for receiving, from said client, a second client request for said second URL, wherein said second client request is received at a second time;

means for storing said second time for subsequent computation of said round-trip latency, wherein said round-trip latency is a difference between said second time and said first time; and means for sending to said client, responsive to receiving said second client request, information associated with said first URL.

15. A method for measuring round-trip latency between a client and a server without requiring a client-side proxy presence in a computing environment connected to a network, comprising the steps of:

receiving, at said server from said client, a first client request for a first Uniform Resource Locator (URL);

determining, responsive to receiving said first client request, that said round-trip latency between said client and said server is to be measured; and measuring said round-trip latency, further comprising the steps of:

storing a first time at which said first client request was received;

responding to said first client request with a redirection response, wherein said redirection response specifies a second URL;

receiving, from said client, a second client request for said second URL, wherein said second client request is received at a second time;

computing a difference between said second time and said first time, wherein said difference represents said round-trip latency; and sending, responsive to receiving said second client request, information associated with said first URL.

16. The method for measuring round-trip latency according to claim 15, wherein said redirection response uses a page temporarily moved status code.

17. The method for measuring round-trip latency according to claim 15, wherein said redirection response uses a page permanently moved status code.

18. The method for measuring round-trip latency according to claim 15, wherein said first URL is a configurable parameter defined to trigger said determining step.

19. The method for measuring round-trip latency according to claim 15, wherein said server is a server-side proxy server, and further comprising the steps of:

forwarding said first client request from said proxy server to a target server identified in said first client request; and receiving, at said proxy server, a response to said forwarded request from said target server, wherein said response comprises said information associated with said first URL.

20. The method for measuring round-trip latency according to claim 15, wherein said determining step is triggered using a counter of requests received.

21. The method for measuring round-trip latency according to claim 15, wherein said determining step is triggered using a time of day.

22. The method for measuring round-trip latency according to claim 15, wherein said determining step is triggered using a source address in said first client request.

23. A method for measuring round-trip latency between a client and a server without requiring a client-side proxy presence in a computing environment connected to a network, comprising the steps of:

receiving, at said server from said client, a first client request for a first Uniform Resource determining, responsive to receiving said first client request, that said round-trip latency between said client and said server is to be measured; and measuring said round-trip latency, further comprising the steps of:

storing a first time at which said first client request was received;

responding to said first client request with a redirection response, wherein said redirection response specifies a second URL;

receiving, from said client, a second client request for said second URL, wherein said second client request is received at a second time;

storing said second time for subsequent computation of said round-trip latency, wherein said round-trip latency is a difference between said second time and said first time; and sending to said client, responsive to receiving said second client request, information associated with said first URL.

* * * * *